(12) United States Patent
Stanhope

(10) Patent No.: US 7,987,220 B2
(45) Date of Patent: Jul. 26, 2011

(54) COMPUTING FILTER COEFFICIENTS FOR AN EQUALIZER IN A COMMUNICATION RECEIVER

(75) Inventor: David Stanhope, Bayswater North (AU)

(73) Assignee: NEC Corporation, Tokyo (JP)

( * ) Notice: Subject to any disclaimer, the term of this patent is extended or adjusted under 35 U.S.C. 154(b) by 1090 days.

(21) Appl. No.: 11/666,609

(22) PCT Filed: Dec. 20, 2005

(86) PCT No.: PCT/JP2005/023838
§ 371 (c)(1),
(2), (4) Date: Apr. 30, 2007

(87) PCT Pub. No.: WO2006/068278
PCT Pub. Date: Jun. 29, 2006

(65) Prior Publication Data
US 2007/0260659 A1    Nov. 8, 2007

(30) Foreign Application Priority Data

Dec. 20, 2004  (AU) ............................... 2004907216
Dec. 14, 2005  (AU) ............................... 2005244521

(51) Int. Cl.
    *G06F 17/10* (2006.01)
    *H03H 7/30* (2006.01)
(52) U.S. Cl. ........................................ 708/323; 375/229
(58) Field of Classification Search .................. 708/322; 375/232, 233
See application file for complete search history.

(56) References Cited

U.S. PATENT DOCUMENTS

| 3,974,449 A | 8/1976 | Falconer |
| 4,644,562 A * | 2/1987 | Kavehrad et al. ............. 375/232 |
| 5,068,873 A | 11/1991 | Murakami |
| 5,283,811 A | 2/1994 | Chennakeshu et al. |
| 5,436,929 A | 7/1995 | Kawas Kaleh |
| 5,790,598 A | 8/1998 | Moreland et al. |
| 7,092,436 B2 * | 8/2006 | Ma et al. ....................... 375/229 |
| 7,218,693 B2 * | 5/2007 | Troulis .......................... 375/346 |
| 7,327,810 B2 * | 2/2008 | Kim et al. ..................... 375/340 |

FOREIGN PATENT DOCUMENTS

AU    2005203278 A1    7/2005

OTHER PUBLICATIONS

Naofal Al-Dhahir and John M. Cioffi, "Fast Computation of Channel-Estimate Based Equalizers in Packet Data Transmission", IEEE Transactions on Signal Processing, vol. 43, No. 11, (Nov. 1995), pp. 2462-2473.

Bin Yang, "An Improved Fast Algorithm for Computing the MMSE Decision-Feedback Equalizer", International Journal of Electronics and Communications (AEU), vol. 53, No. 6, (1999), pp. 339-345.

H.R. Karimi and N.W. Anderson, "A Novel and Efficient Solution to Block-Based Joint-Detection Using Approximate Cholesky Factorization", The Ninth IEEE International Symposium on Personal, Indoor and Mobile Radio Communications, vol. 3 (Sep. 1998), pp. 1340-1345.

* cited by examiner

*Primary Examiner* — Chuong D Ngo
(74) *Attorney, Agent, or Firm* — McGinn IP Law Group, PLLC

(57) ABSTRACT

The present invention provides an equalizer (200) and a method for computing equalizer filter coefficients in a communication receiver. The equalizer filter coefficients are computed on the basis of a real matrix T which is generated from channel estimation vector f, which is derived from the channel estimation inputs.

10 Claims, 4 Drawing Sheets

```
%%%%% Forming T matrix --->>>
%% Start with f vector: dimension of N
%%
%% Note choose N to be an odd number.
%% Do middle row first, since then we can use the elements of the middle row
%% in the array as inputs back into the shift register. Note only half the f
%% vector is needed for the middle row and as inputs to the shift register:
%%
T_MATRIX((N+1)/2, (N+1)/2) = real(f(1)/2)
%% For col = 1 to middle-1:
for col = 1 : (N-1)/2
  T_MATRIX((N+1)/2, (N+1)/2 - col) = real(f(col+1))
  T_MATRIX((N+1)/2, (N+1)/2 + col) = imag(f(col+1))
end
%% Now do the main part of the array:
%% For row = 1 to (bottom-1)/2: (intend to do 2 rows (real, imag) for each shift of f)
for row = 1 : (N-1)/2
%%    For col = 1 to middle-1: (half is adding, half is subtracting, middle is nothing)
  for col = 1 : (N-1)/2
%%   real terms of real eqn:
    T_MATRIX(row,col) = real(f(col)) + real(f(N+1-col))
%%   imag terms of imag eqn:
    T_MATRIX(N+1-row,N+1-col) = real(f(col)) - real(f(N+1-col))
  end
%%   middle term of real eqn:
  T_MATRIX(row,(N+1)/2) = real(f((N+1)/2))
%%   middle term of imag eqn:
  T_MATRIX(N+1-row,(N+1)/2) = imag(f((N+1)/2))
%%    For col = middle+1 to end: (swap adding and subtracting operations)
  for col = ((N+1)/2 + 1) : N
%%   real terms of real eqn:
    T_MATRIX(row,col) = imag(f(col)) - imag(f(N+1-col))
%%   imag terms of imag eqn:
    T_MATRIX(N+1-row,N+1-col) = imag(f(col)) + imag(f(N+1-col))
  end
%%    Now shift the f vector for the next two rows:
%%    For col = 1 to end:
  for col = N:-1:2
    f(col) = f(col-1)
  end
%% Note conjugate in the next line:
  f(1) = COMPLEX(T_MATRIX((N+1)/2,(N+1)/2 - row),T_MATRIX((N+1)/2, (N+1)/2 + row))'
%% End for row = ...
end
```

FIG. 3

```
v_Vector = 0.5*INV_T_Matrix((1 : N),(N+1)/2)
% Note: we have found middle COLUMN of inverse, need to take transpose for middle row ($c_0^H$)!
C_zero_transp((N+1)/2) = v_Vector((N+1)/2)
for row = 1 : (N-1)/2
   C_zero_transp (row) = v_Vector(row) - complex(0,v_Vector(N+1-row))
end
for row = (N+1)/2 + 1 : N
   C_zero_transp (row) = v_Vector(N+1-row) + complex(0,v_Vector(row))
end
```

FIG. 4

COMPUTING FILTER COEFFICIENTS FOR AN EQUALIZER IN A COMMUNICATION RECEIVER

FIELD OF THE INVENTION

The present invention relates generally to equalizers in radio communication receivers.

BACKGROUND OF THE INVENTION

Most modern radio communication systems transmit data over time-varying, dispersive communication channels. Among the distortions introduced by the channel, inter-symbol interference (ISI) is significant because it severely degrades the performance of the receiver. To mitigate the effects of ISI, many receivers use equalizers. The general architecture of an equalizer comprises filters, adders for combining the output of the filters, and decision devices. The filters are linear finite-impulse-response (FIR) with complex coefficients. A decision device operates on complex inputs and outputs complex values that are representative of the signal constellation points of the modulation scheme.

In general, the equalizer filter coefficients are jointly optimized according to a criterion suitable for the communication system. Determining the optimal equalizer filter coefficients is a computationally intensive task because it requires the solution to a large set of linear equations. Two general approaches are commonly used today: the first approach is the adaptive approach, and the second is the direct matrix inversion approach.

In the adaptive approach, the equalizer filter coefficients are first set to some initial values. The output error signal, defined as the difference between the input and the output of the equalizer decision device, is then used to recursively adjust the equalizer filter coefficients toward the optimal settings. Depending on the coefficient adaptation algorithm employed, a training sequence may be required. A training sequence is a known set of symbols that the transmitter sends along with the data. In U.S. Pat. No. 5,068,873 issued to Murakami, the least mean square (LMS) or Kalman filter algorithm is used for adaptation. A training sequence is required for that approach. The LMS algorithm requires $O(N)$ complex operations per iteration, where N is the total number of coefficients to optimize. Furthermore, a large number of iterations (>>N) is required for the equalizer filter coefficients to converge to the optimal values. While Kalman filter algorithm converges faster to the optimal solution, it requires $O(N^2)$ operations per iteration. Similarly, U.S. Pat. No. 5,283,811 issued to Chennankeshu, et al. employs the fast Kalman algorithm for decision-feedback equalizer (DFE) coefficient adaptation. U.S. Pat. No. 3,974,449 issued to Falconer describes a DFE adaptation method that does not use training sequences.

In the direct matrix inversion approach, a response of the channel to the signaling pulse is first estimated. This estimate is the response, filtered by the receiver filter, of the channel to the transmitter spectral-shaping pulse. The equalizer coefficients are then obtained from the estimate of the response of the channel to the signaling pulse by solving a set of complex-valued linear equations. In general, the solution of these equations requires the inversion of an N×N square matrix, which requires $O(N^3)$ complex multiplications. U.S. Pat. No. 5,436,929 issued to Kawas Kaleh utilizes positive-definite and Hermitian symmetric properties of the square matrix so that a Cholesky decomposition can be used. The Cholesky decomposition requires $O(N^3)$ complex multiplications to factor a positive-definite, Hermitian symmetric matrix into the product of lower and upper triangular matrices. The upper triangular matrix is equal to the Hermitian transpose of the lower triangular matrix. The triangular matrices are easily invertible, requiring $O(N^3)$ multiplications. U.S. Pat. No. 5,790,598 issued to Moreland, et al. describes a recursive method using the Cholesky decomposition. Both of these techniques still require $O(N^3)$ complex multiplications.

In general, the optimization of the equalizer coefficients requires at least $O(N^3)$ complex multiplies if direct matrix inversion is used. This complexity makes the method impractical to implement in many real life communication system. The complexity may be even greater for the adaptive approach if a large number of iterations are required. Moreover, the adaptive approach usually results in sub optimal solution compared to the direct matrix inversion method.

It should be noted that in the present specification, the mathematical notations used are such that uppercase notation, e.g. W, is used to denote a matrix, and lowercase notation, e.g. w, is used to denote a vector.

FIG. 1, shows a generic equalizer device 10 used in a communication system. The equalizer 10 is designed to restore the transmitted signal distorted by dispersive channel (characterized by channel response matrix H) and noise (characterized by variance $\sigma^2$). In order to compute filter coefficients for the equalizer, a channel response matrix G is computed based on estimate of channel response matrix H. This step is commonly performed using pilot signaling. The signal processing is usually done in the equalizer 10 in block by block fashion. A first channel matrices estimation block 12 receives input signals (vector r) for use in estimating channel response matrices H and G. The filter coefficients vectors are then computed in a filter coefficients calculation block 14 where the computation involves the inversion of channel response matrix G. The computed filter vector $w_0$ is then used to equalize the received vector r by means of an FIR filter 16 to obtained the output data subsequently used in a communication receiver.

In order to understand the computational complexity of the inversion of channel response matrix G, a typical method for matrix inversion will now be described.

The vector of channel estimates h is used for computation of the vector f where, for example, for five multipaths and three timing positions per multipath, $$h = [h_{-0}, h_0, h_{+0}, 0, \ldots, 0, h_{-1}, h_1, h_{+1},$$
$$0, \ldots, 0, h_{-5}, h_5, h_{+5}, 0, \ldots, 0]$$

$$f = [f(0), f(1), \ldots, f(N-1)]$$

$$f(i) = \sum_{n=0}^{n=N-1-i} h[n]h[n+i]^*$$

Construct matrix G as follows:

$$G = \begin{bmatrix} f(0)+\beta & f(1) & \cdots & f(N-1) \\ f(-1) & f(0)+\beta & & f(N-2) \\ \vdots & \vdots & \ddots & \vdots \\ f(-N+1) & f(-N+2) & \cdots & f(0)+\beta \end{bmatrix}$$

$$f(-i) = f(i)^* \text{ and } f(0) > 0$$

Since the channel response matrix G is Hermitian and positive definite, there is unique lower (upper) triangular matrix L(U) such that $G=LL^H=U^HU$, when the superscript H indicates the Hermitian transpose of a matrix. In general, we have $$GG^{-1}=I \Leftrightarrow L(L^HG^{-1})=I \Leftrightarrow LD=I \quad (1)$$

where the superscript −1 indicates the inverse of a matrix and I is the identity matrix. Moreover, we also have $$L^HG^{-1}=D \quad (2)$$

To find the inverse channel response matrix $G^{-1}$, the following steps need to be carried out:

Step 1: Perform a Cholesky decomposition of the channel response matrix to obtain the lower triangular matrix L—calculation complexity $O(N^3)$.

Step 2: Solve equation (1) to get matrix D using Forward Substitution as the lower triangular matrix L.

Step 3: Solve equation (2) to get the inverse channel response matrix $G^{-1}$ using Backward Substitution on the matrices D and $L^H$.

Since the system of linear equations has N times N unknowns (D and $G^{-1}$ are N×N matrices), Steps 2 and 3 in the above-described method has a calculation complexity of $O(N^3)$.

Using a method, such as that described in co-pending Australian patent application no. 2005203278, in the name of NEC Australia Pty Ltd, filed on 26 Jul. 2005 and entitled "Method for calculating filter coefficients for an equalizer in a communication receiver," the calculation complexity of steps 2 and 3 can be reduced to $O(N^2)$. In this case the complexity of the decomposition step (Step 1) becomes the main contributor to the complexity, processing time and size in computing the equalizer filter coefficients in an equalizer.

Thus there is a need for an efficient method for computing the equalizer filter coefficients in an equalizer that can practically be implemented in a communication receiver. It would be desirable for the method for computing the equalizer filter coefficients to be computationally less complex than currently known methods. It would also be desirable to provide a method for computing the equalizer filter coefficients with fewer computations as this can lead to a reduction in the circuit area required and power consumed and/or faster processing times. It would also be desirable to provide a method for computing the equalizer filter coefficients in an equalizer that ameliorates or overcomes one or more problems of known coefficient computation methods.

SUMMARY OF THE INVENTION

In a first aspect the present invention provides a method for computing equalizer filter coefficients in a communication receiver on the basis of a real matrix T generated from channel estimation vector f, which is derived from the channel estimation inputs. This avoids the need to perform the inversion of a complex channel matrix G.

The method preferably includes directly forming T from vector f.

In an embodiment where f is a vector of dimension N, chosen to be odd, and defined as described above, and T is an N×N matrix, the matrix T can be generated by solving $Gc_0=i_0$ for each of the real and imaginary terms in the inverse G matrix's middle column $c_0$ and the identity matrix's middle column $i_0$. In this embodiment T can be generated as follows:

$T((N+1)/2, (N+1)/2)=R[f(1)/2]$; where rows and columns are numbered from 1 to N, and the notation T(x, y) denotes the entry in the matrix T in its x-th row and y-th column, and R[z] denotes the real part of z and I[z] denotes the imaginary part of z;

for row (N+1)/2, column numbers from 1 to (N−1)/2, $T((N+1)/2, (N+1)/2-\text{column number})=R[f(\text{col}+1)]$ and $T((N+1)/2, (N+1)/2+\text{column number})=I[f(\text{col}+1)]$; and for row number 1 to (N−1)/2, and for the middle column $T(\text{row number}, (N+1)/2)=R[f((N+1)/2)]$;

$T(N+1-\text{row number}, (N+1)/2)=I[f((N+1)/2)]$;

for column numbers 1 to (N−1)/2

$T(\text{row number, column number})=R[f(\text{column number})]+R[f(N+1-\text{column number})]$;

$T(N+1-\text{row number}, N+1-\text{column number})=R[f(\text{column number})]-R[f(N+1-\text{column number})]$;

for column numbers from ((N+1)/2+1) to N $T(\text{row number, column number})=I[f(\text{column number})]-I[f(N+1-\text{column number})]$ $T(N+1-\text{row number}, N+1-\text{column number})=I[f(\text{column number})]+I[f(N+1-\text{col})]$ for f vector column numbers from N down to 2

$f(\text{col})=f(\text{col}-1)$ $R[f(1)]=T((N+1)/2, (N+1)/2-\text{row})$ $I[f(1)]=-T((N+1)/2, (N+1)/2+\text{row}))$ The method can also include the steps of:

performing matrix inversion on T in order to determine the middle column of $T^{-1}$;

forming a vector v from the middle column of $T^{-1}$ and a constant;

determining $c_0^H$ on the basis of v; and determining the filter coefficients $w_0$ using the relationship $w_0=c_0^H H^H$ where $H^H$ is the Hermitian transpose of the channel response matrix H.

In an exemplary embodiment matrix inversion can include performing Cholesky decomposition on T to get a lower triangular matrix L, and then performing forward and backward substitution on L.

Preferably, where v and $c_0^H$ have elements 1 to N, and the notation v(x) denotes he x-th element in vector v; the step of determining $c_0^H$ on the basis of v includes:

Setting $c_0^H((N+1)/2)$ to be equal to $v((N+1)/2)$;

for elements 1 to (N−1)/2 of $c_0^H$, setting $c^{0H}$ (element no) to be equal to v(element number)−(0+i(v(N+1−element number))

and for elements (N+1)/2 to N of $c_0^H$, setting $c_0^H$ (element no) to be equal to v(N+1−element number)+(0+i(v(element number)).

In a second aspect the present invention provides a method of processing a received signal in a communications receiver, the method including;

computing one or more equalizer filter coefficients using a method of the first aspect of the invention; and equalizing the received signal using the computed equalizer filter coefficients.

In a third aspect the present invention provides an equalizer configured to implement a method according to either of the abovementioned aspects of the invention.

In a fourth aspect the present invention provides an equalizer for use in a communication receiver, the equalizer including:

a first input for receiving a input data for equalization;

a second input for receiving channel estimation data relating to the input data;

a signal processing path configured to perform a signal processing method of claim 8 on the input data to generate an equalized output data; and at least output for outputting s equalized output data.

The equalizer can include one or more of the following signal processing blocks:

a channel matrix calculation block configured to compute vectors h and f based on the basis of a received channel estimation;

a real matrix calculation block configured to form the matrix T;

a matrix decomposition block for performing matrix decomposition on T;

a forward and backward substitution block configured to compute values of elements in a middle column of $T^{-1}$;

a middle column calculation block configured to determine element values in a middle column of $G^{-1}$ ($c_0$);

a filter coefficient generation block configured to compute filter coefficients $w_0 = c_0^H H^H$; and a finite impulse response filter.

In a further aspect the present invention provides a communications receiver including an equalizer of according to the previous aspect of the invention.

BRIEF DESCRIPTION OF THE DRAWINGS

To facilitate an understanding of the invention, reference is made in the description to the accompanying drawings, in which an equalizer and method of computing filter coefficients for an equalizer are illustrated in a preferred embodiment. It is to be understood that the invention is not limited to the preferred embodiment as illustrated in the drawings. In the drawings:

FIG. 3 lists an exemplary matlab implementation of an algorithm which can be used to generate T from the vector f in accordance with an embodiment of the present invention; and FIG. 4 lists an exemplary matlab implementation of an algorithm that can be used to compute $c_0$ in an embodiment of the present invention.

DETAILED DESCRIPTION OF THE EMBODIMENTS

Figure 1:
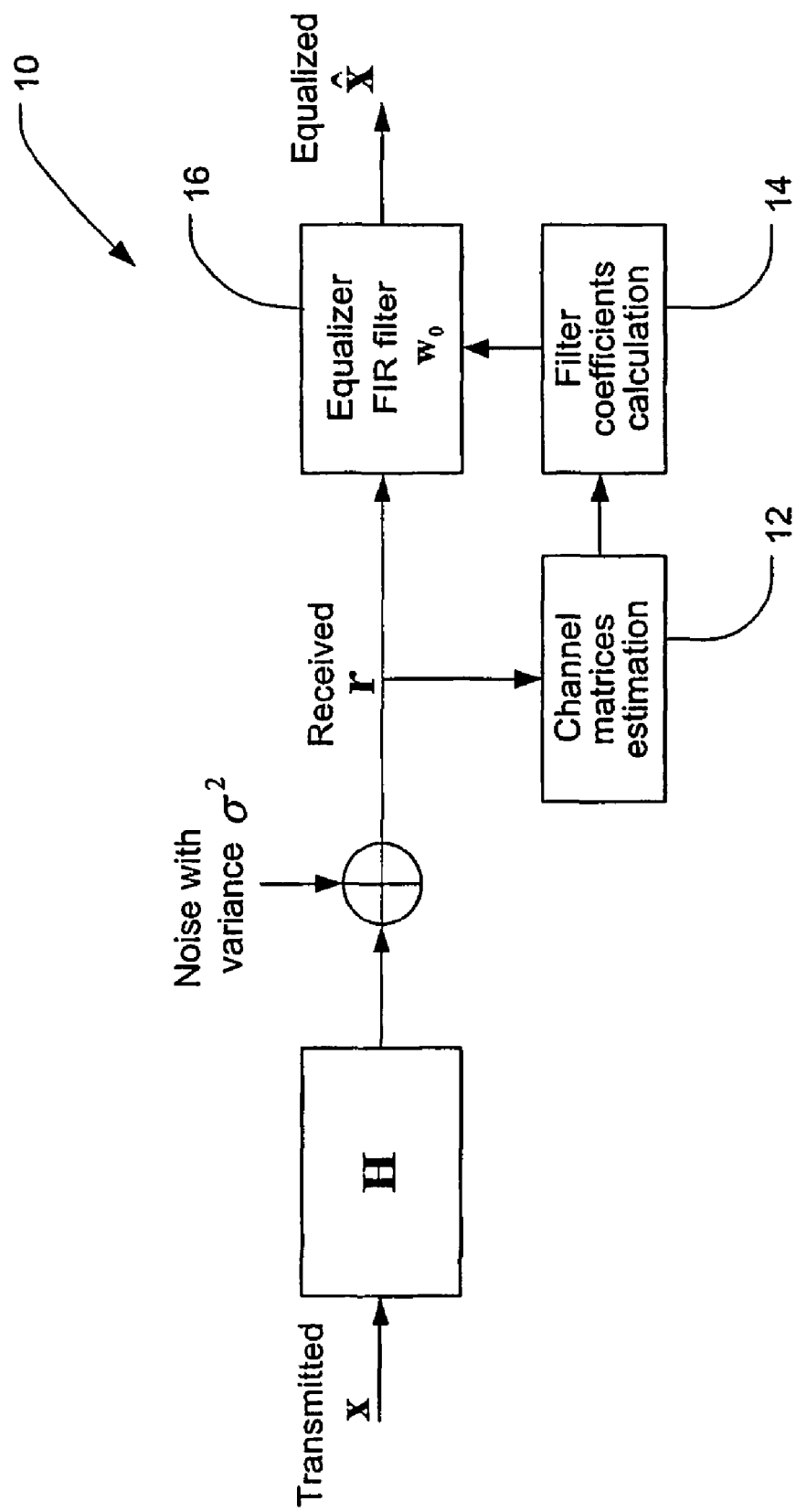
FIG. 1 is a schematic diagram of a known equalizer used in a communication system.

Computation of the vector of filter coefficients aims to find the middle row $w_0$ of the matrix $W = [H^H H + \sigma^2 I]^{-1} H^H = G^{-1} H^H$ where G and H are channel response matrices, I is the identity matrix, the superscript H indicates the Hermitian transpose of a matrix and the superscript $-1$ indicates the inverse or reciprocal of a matrix.

This means one would have to compute middle row vector $r_0$ of $G^{-1}$ and then multiply with $H^H$ to obtain vector $w_0$ since $w_0 = r_0 H^H$. If the dimension of G is N then $O(N^3)$ complex multiplications would be required to compute $r_0$.

The current invention exploits the fact that $G^{-1}$ and G are Hermitian. Therefore, instead of having to fully compute $G^{-1}$ and then find its middle row $r_0$, only the middle column (denoted as $c_0$) of $G^{-1}$ is computed, which can then be used to obtain $w_0 = c_0^H H^H$.

Further more, since the present inventor has observed that $G^{-1}$ is also Toeplitz, and the middle element of $c_0$ is real, as a result of $G^{-1}$ being Hermitian, it can be seen that $c_0$ is made up from only $(N+1)/2$ real terms and $(N-1)/2$ imaginary terms. These N real variables form the vector v.

From the definition $GG^{-1} = I$, if we consider just the complex middle column $i_0$ of the identity matrix I, we also have:

$$Gc_0 = i_0.$$

Solving the above matrix equation for each of the real and imaginary terms in $i_0$ gives us N distinct real equations involving the N real variables of v. This can be written as $Tv = i$.

Where T is the new real N×N matrix made from the coefficients of v in the above N distinct real equations, and i is the vector made from the appropriate real and imaginary terms in $i_0$. Therefore $v = T^{-1} i$.

Since all the elements of i are zero except for the middle element, v is just the middle column of $T^{-1}$ times a constant. Once we know real vector v we also know $c_0$. This result changes the original problem of performing the complex inversion of the G matrix into the real inversion of the T matrix which can be performed as will be shown below.

In order to aid understanding of the preferred embodiment, an example of how the matrix T can be of formed will now be given. In this example assume that N=3. We know that $c_0$, which is the middle column of the inverse of the channel r matrix G, can be written as a column vector:

$$\begin{bmatrix} x1 + jy1 \\ x2 \\ x1 - jy1 \end{bmatrix},$$

which has 3 real terms: x1, x2 and y1.

In this case, let $$G = \begin{bmatrix} a & b+jc & d+je \\ b-jc & a & b+jc \\ d-je & b+jc & a \end{bmatrix}$$

Expanding $Gc_0 = i_{(N+1)/2}$, we obtain, for Row 1

$$a*(x1+jy1)+(b+jc)*x2+(d+je)*(x-jy1)=(0+j0)$$

Separating the real and imaginary terms gives:

Real $$(a+d)*x1+b*x2+e*y1=0$$

Imaginary $$e*x1+c*x2+(a-d)*y1=0$$

For Row 2 we obtain:

$$(b-jc)*(x1+jy1)+a*x2+(b+jc)*(x-jy1)=(1+j0)$$

The real terms of which are $$2*b*x1+a*x2+2*c*y1=1$$

Dividing both sides of this expression by two gives:

Real:

$$b*x1+(a/2)*x2+c*y1=0.5$$

These three equations can then be used to form the basis of system of linear equation as follows:

$$Tv = \begin{bmatrix} a+d & b & e \\ b & a/2 & c \\ e & c & a-d \end{bmatrix} \times \begin{bmatrix} x1 \\ x2 \\ y1 \end{bmatrix} = \begin{bmatrix} 0 \\ 0.5 \\ 0 \end{bmatrix}$$

Figure 2:
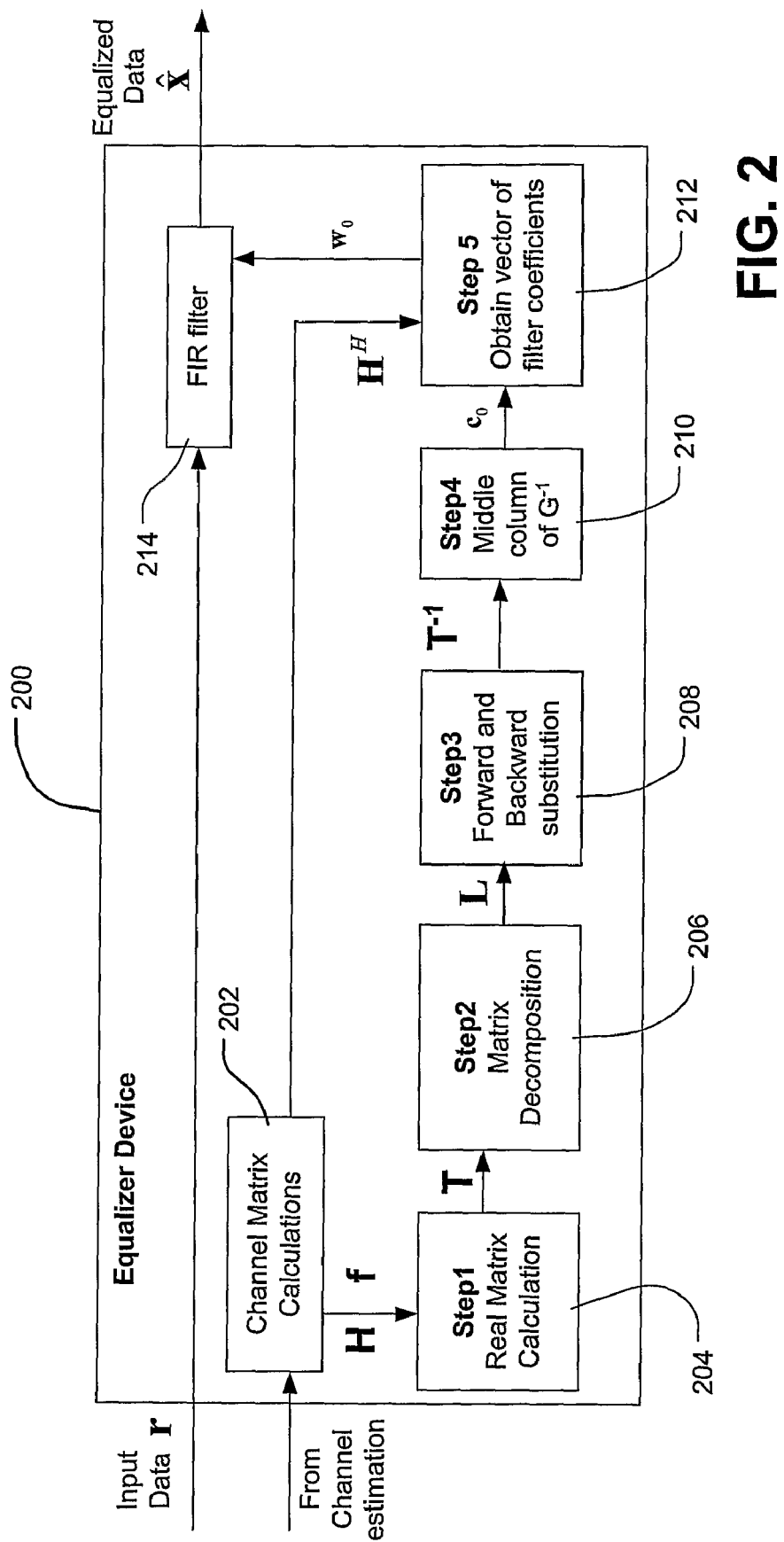
FIG. 2 is a schematic diagram of an equalizer which equalizer computes filter coefficients according to an embodiment of the present invention.

In a preferred embodiment an equalizer device is proposed with functional diagram as outlined in FIG. 2. An equalizer device of this type can significantly reduce (by a factor of 4) computational requirements for generating filter coefficients and thus become suitable for use in practical a communication system.

The equalizer 200 contains 7 main blocks, as follows:

Channel matrix calculation block 202: This block performs computation of vectors h and f based on the channel estimation input as described above.

Real Matrix calculation block 204: This block uses the vector f to directly form the matrix T instead of the G matrix described above.

An exemplary matlab algorithm which can be used to generate T from the vector f in accordance with the methodology described above is given in FIG. 3.

Matrix decomposition block 206: This functional block performs standard matrix decomposition (for example Cholesky decomposition) on T.

Forward and Backward substitution block 208: This block performs standard forward and backward substitution to get the middle column of $T^{-1}$.

Middle Column of $G^{-1}(c_0)$ Calculation block 210: This block forms v as just the middle column of $T^{-1}$ times a constant (0.5). Once we know real vector v we also know $c_0$, and therefore $c_0^H$. The exemplary matlab algorithm of FIG. 4 can be used to compute $c_0$ and hence $c_0^H$.

Filter coefficient generation block 212: This block performs a computation to get the filter coefficients $w_0 = c_0^H H^H$.

FIR filter 214: The FIR filter filters the input data with updated filter coefficients $w_0$ from time to time.

As will be appreciated by those skilled in the art because the illustrative embodiment operates on a real matrix T instead of the complex matrix G the computational complexity, size and processing time are significantly reduced which results in an equalizer made in accordance with this embodiment to be implemented in practical communication devices.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method for computing equalizer filter coefficients in a communications receiver, the method including:

determining, using a processor in a computer, a channel estimation vector f, from at least one channel estimation input;

determining equalizer filter coefficients on a basis of a real matrix T generated from said channel estimation vector f, vector f comprising a vector of dimension N, N comprising an odd number, and T comprising an N×N matrix;

generating the matrix T by solving a matrix $Gc_0 = i_0$ for each real and imaginary term in $c_0$, wherein G is a channel estimation matrix, $c_0$ comprises an inverse of a middle column of the matrix G, and $i_0$ comprises an identity matrix's middle column;

performing a matrix inversion on the matrix T in order to determine a middle column of $T^{-1}$;

forming a vector v from a middle column of a matrix $T^{-1}$ and a constant;

determining $c_0^H$ on a basis of v; and determining filter coefficients $w_0$ using a relationship $w_0 = c_0^H H^H$ where $H^H$ comprises a Hermitian transpose of a channel response matrix H, wherein, the elements of $c_0^H$ are determined on a basis of v according to the following:

$c_0^H((N+1)/2)$ to be equal to $v((N+1)/2)$;

for elements 1 to $(N-1)/2$ of $c_0^H$, $c_0^H(x)$ equals $v(x)-(0+i(v(N+1-x))$; and for elements $(N+1)/2$ to N of $c_0^H$, $c_0^H(x)$ equals $v(N+1-x)+(0+i(v(x))$, wherein v and $c_0^H$ comprise elements 1 to N, and notations $v(x)$ and $c_0^H(x)$ denote an x-th element in vectors v and $c_0^H$ respectively, wherein rows and columns of the matrix T and columns of vector f, are numbered from 1 to N, a notation T(x, y) denotes an entry in the matrix T in its x-th row and v-th column, a notation f(y) denotes an entry in vector f in its v-th column; R[z] denotes a real part of a number z; and I(z) denotes an imaginary part of the number z, and wherein the elements of the matrix T are generated as follows:

$T((N+1)/2, (N+1)/2) = R[f(1)/2]$;

for row $(N+1)/2$, column numbers from 1 to $(N-1)/2$:

$T((N+1)/2, (N+1)/2-\text{column number}) = R[f(\text{col}-1)]$ and $T((N+1)/2, (N+1)/2+\text{column number}) = I[f(\text{col}+1)]$; and for row number 1 to $(N-1)/2$ and for the middle column:

$T(\text{row number}, (N+1)/2) = R[f((N+1)/2]$ ; and $T(N+1-\text{row number}, (N+1)/2) = I[f((N+1)/2)]$;

for column numbers 1 to $(N-1)/2$:

$T(\text{row number, column number}) = R[f(\text{column number})] + R[f(N+1-\text{column number})]$; and $T(N+1-\text{row number}, N+1-\text{column number}) = R[f(\text{column number})] - R[f(N+1-\text{column number})]$;

for column numbers from $((N+1)/2+1)$ to N:

$T(\text{row number, column number}) = I[f(\text{column number})] - I[f(N+1-\text{column number})]$; and $T(N+1-\text{row number}, N+1-\text{column number}) = I[f(\text{column number})] + I[f(N+1-\text{col})]$; and for f vector column numbers from N down to 2:

$f(\text{col}) = f(\text{col}-1)$;

$R[f(1)] = T((N+1)/2, (N+1)/2-\text{row})$; and i $I[f(1)] = -T((N+1)/2, (N+1)/2+\text{row}))$.

2. A method as claimed in claim 1, further comprising directly forming the matrix T from said vector f.

3. A method as claimed in claim 2, further comprising:
conducting a matrix inversion on the matrix T using a Cholesky decomposition to obtain a lower triangular matrix L, and
performing forward and backward substitution on the matrix L.

4. A method of processing a received signal in a communications receiver, said method comprising:
computing one or more equalizer filter coefficients using a method as claimed in claim 2; and
equalizing said received signal using the computed equalizer filter coefficients.

5. A method as claimed in claim 1, further comprising:
conducting a matrix inversion on the matrix T using a Cholesky decomposition to obtain a lower triangular matrix L, and
performing a forward and a backward substitution on L.

6. A method of processing a received signal in a communications receiver, said method comprising:
computing one or more equalizer filter coefficients using a method as claimed in claim 1; and
equalizing said received signal using the computed equalizer filter coefficients.

7. An equalizer for use in a communication receiver, the equalizer comprising:
a first input for receiving a input data for equalization,
a second input for receiving channel estimation data relating to the input data;
a signal processing path configured to perform a signal processing method of claim 6 on said input data to generate an equalized output data; and
at least one output unit for outputting said equalized output data.

8. An equalizer for use in a communications receiver, said equalizer being configured to implement a method according to claim 1.

9. An equalizer as claimed in claim 8, wherein the equalizer includes one or more of the following signal processing blocks:
a channel matrix calculation block configured to compute vectors h and f based on a basis of a received channel estimation;
a real matrix calculation block configured to form the matrix T;
a matrix decomposition block for performing a matrix decomposition on the matrix T;
a forward and backward substitution block configured to compute values of elements in a middle column of the matrix $T^{-1}$;
a middle column calculation block configured to determine element values in a middle column of the matrix $G^{-1}$ ($c_0$);
a filter coefficient generation block configured to compute filter coefficients $w_0 = c^{0H} H^H$; and
a finite impulse response filter.

10. A communications receiver including an equalizer according to claim 8.

* * * * *